United States Patent
Kwon

(10) Patent No.: US 12,356,956 B2
(45) Date of Patent: Jul. 15, 2025

(54) COMPOSITION FOR PRODUCING CAT LITTER USING COFFEE GROUNDS, CAT LITTER, AND METHOD FOR PRODUCING CAT LITTER

(71) Applicant: ALFRED INC., Suwon-si (KR)

(72) Inventor: Soon Woo Kwon, Yongin-si (KR)

(73) Assignee: ALFRED INC., Suwon-si (KR)

(*) Notice: Subject to any disclaimer, the term of this patent is extended or adjusted under 35 U.S.C. 154(b) by 143 days.

(21) Appl. No.: 17/795,306

(22) PCT Filed: Jan. 27, 2021

(86) PCT No.: PCT/KR2021/001053
§ 371 (c)(1),
(2) Date: Jul. 26, 2022

(87) PCT Pub. No.: WO2021/153978
PCT Pub. Date: Aug. 5, 2021

(65) Prior Publication Data
US 2023/0092311 A1    Mar. 23, 2023

(30) Foreign Application Priority Data
Jan. 28, 2020 (KR) .................. 10-2020-0009769

(51) Int. Cl.
*A01K 1/015* (2006.01)
*B01J 20/22* (2006.01)
(Continued)

(52) U.S. Cl.
CPC ............ *A01K 1/0155* (2013.01); *B01J 20/22* (2013.01); *B01J 20/24* (2013.01);
(Continued)

(58) Field of Classification Search
CPC ......... A01K 1/0155; B01J 20/22; B01J 20/24; B01J 20/28004; B01J 20/28016
(Continued)

(56) References Cited

U.S. PATENT DOCUMENTS 5,183,655 A * 2/1993 Stanislowski ........ A01K 1/0155
424/76.6
5,359,961 A * 11/1994 Goss
(Continued)

FOREIGN PATENT DOCUMENTS

| CN | 108323441 A | * | 7/2018 |
| JP | 11-341930 A |   | 12/1999 |
| KR | 101801655 B1 |  | 12/2017 |

OTHER PUBLICATIONS

Vilanova et al. The coffee-machine bacteriome: biodiversity and colonisation of the wasted coffee tray leach. Sci Rep 5, 17163 (2015). https://doi.org/10.1038/srep17163 (Year: 2015).*
(Continued)

*Primary Examiner* — Timothy D Collins
*Assistant Examiner* — Maria E Graber
(74) *Attorney, Agent, or Firm* — WHDA, LLP

(57) ABSTRACT

Proposed are a composition for production of cat litter, cat litter, and a method for production of cat litter, the composition including: 45% to 58% by weight of coffee grounds; 40% to 50% by weight of natural polymer; 0.03% to 3% by weight of polymer gum; and 0.5% to 5% by weight of sodium alginate.

9 Claims, 4 Drawing Sheets

(51) Int. Cl.
    *B01J 20/24*     (2006.01)
    *B01J 20/28*     (2006.01)
    *B01J 20/30*     (2006.01)

(52) U.S. Cl.
    CPC ... *B01J 20/28004* (2013.01); *B01J 20/28016* (2013.01); *B01J 20/3028* (2013.01)

(58) Field of Classification Search
    USPC .......................................................... 119/171
    See application file for complete search history.

(56) References Cited

U.S. PATENT DOCUMENTS

| | | | |
|---|---|---|---|
| 5,526,771 | A * | 6/1996 | Ito |
| 8,034,740 | B2 * | 10/2011 | Kitahata ............ B01J 20/28095 |
| | | | 428/221 |
| 8,236,286 | B2 * | 8/2012 | Yano ..................... A61P 31/04 |
| | | | 424/57 |
| 9,307,742 | B2 * | 4/2016 | Ito ......................... A01K 1/0155 |
| 10,813,375 | B2 * | 10/2020 | Liu ...................... B01J 20/2805 |
| 2002/0038633 | A1 * | 4/2002 | Hayakawa ............ C08B 11/00 |
| | | | 119/171 |
| 2004/0247706 | A1 * | 12/2004 | Roberts |
| 2006/0213448 | A1 * | 9/2006 | Yasukawa ............ A01K 1/0155 |
| | | | 119/171 |
| 2006/0251724 | A1 * | 11/2006 | Farrell .................... A61P 11/10 |
| | | | 424/487 |
| 2007/0289543 | A1 * | 12/2007 | Petska .................. A01K 1/0154 |
| | | | 119/173 |
| 2008/0023396 | A1 * | 1/2008 | Fugetsu ................. B82Y 30/00 |
| | | | 516/38 |
| 2008/0230744 | A1 * | 9/2008 | Hiramoto .............. A23L 3/3436 |
| | | | 252/188.28 |
| 2015/0351362 | A1 * | 12/2015 | Hiroshima ........... A01K 1/0155 |
| | | | 119/172 |
| 2021/0380422 | A1 * | 12/2021 | Hoda .................... A61K 9/5123 |
| 2023/0092311 | A1 * | 3/2023 | Kwon ................... B01J 20/3028 |
| | | | 119/171 |

OTHER PUBLICATIONS

Gokulakrishnan et al;Microbial and enzymatic methods for the removal of caffeine; Enzyme and Microbial Technology vol. 37, Issue 2 (https://www.sciencedirect.com/science/article/pii/S0141022905001055?ref=pdf_download&fr=RR-2&rr=8e8a5ab8fdb382f3) (Year: 2005).*

International Search Report dated Apr. 9, 2021, issued in counterpart International Application No. PCT/KR2021/001053 (3 pages).

* cited by examiner

COMPOSITION FOR PRODUCING CAT LITTER USING COFFEE GROUNDS, CAT LITTER, AND METHOD FOR PRODUCING CAT LITTER

TECHNICAL FIELD

The present disclosure relates to a composition for production of cat litter using coffee grounds, cat litter, and a method for production of cat litter.

BACKGROUND ART

In modern society, pets are raised in many households, and in particular, cats are becoming family beyond the concept of animals. Just like humans, a house, food, and various tools are essential to raising a cat, and in the case of food and animal cages, various types of feed and cages are widely distributed and used according to the characteristics of animals.

Since modern people regard cats as members of the family and as companions living together, various cat products have been developed and used in various ways. Cat cages are not simply a place to keep a cage or a means for sleeping, but various convenience facilities such as toilet space, feed space, sleeping space, and playing space should be provided so that cats can live in a sanitary and clean environment.

In particular, in the case of a cat, unlike other pets, since they have the characteristic of burying their excrement in the sand when they defecate or urinate, sand (also known as cat litter) is essential for this, and without sand, smooth defecation cannot be achieved. Therefore, cat litter and toilet products have been developed and used in various ways.

Cat litter is largely classified into absorption-type sand and coagulation-type sand, depending on how it is used. The absorption-type sand is a product having a function of absorbing cat's urine and representative examples thereof are absorption-type sand using silica ($SiO_2 \cdot 2H_2O$) which is used as a desiccant or using grains such as paper sand, corn, or beans. As coagulation-type sand, sand obtained by crushing sodium-based bentonite collected from a mine is used.

The sodium-based bentonite can be collected only in some countries, and the reserves are limited, and only calcium-based bentonite can be collected in Korea.

As described above, the absorption-type sand using silica or paper and grain has excellent water absorption, so it has excellent cat urine absorption, but it has little coagulation power, so it does not form agglomeration in the form of solids, and the deodorization function for an ammonia odor is remarkably poor. In particular, since silica sand contains components that are harmful to the human body and the environment, it has the disadvantage of providing causes of diseases such as eye diseases and skin diseases.

In addition, in the case of grain-based sand or paper-based sand, there are problems of a shortage of grain and inconvenient post-treatment process, and it provides causes of environmental destruction such as forest damage to obtain paper. In the case of reusing poor paper materials, harmful ingredients contained in the paper regeneration process create an environment that is not good for cats as well as humans.

Coagulation-type sand using sodium-based bentonite is widely used as a product with excellent coagulation power, but since minerals are collected and crushed in a small particle state, dust is severely generated, and the surface of the particles is sharply formed due to crushing, and thus, the cat may hurt its skin in the process of toilet.

DISCLOSURE

Technical Problem

The present disclosure has been devised to solve the above problems of the related art. The objective of the present disclosure is to provide a composition for production of cat litter using coffee grounds that is convenient because it has excellent deodorization and dehumidification ability, can be thrown into the toilet, can be produced from small particles that cats like, and is eco-friendly and economical because it uses waste.

The other objective of the present disclosure is to provide a method for production of cat litter that can be produced into small particles that cats like.

Technical Solution

The present disclosure, in order to achieve the above objective,
provides a composition production of cat litter, the composition includes: 45% to 58% by weight of coffee grounds; 40% to 50% by weight of natural polymer; 0.03% to 3% by weight of polymer gum; and 0.5% to 5% by weight of sodium alginate.

In addition, the present disclosure
provides cat litter made of the composition for production of cat litter.

In addition, the present disclosure
provides a method for production of cat litter, the method includes: (a) mixing a composition for production of cat litter including: 45% to 58% by weight of coffee grounds; 40% to 50% by weight of natural polymer; 0.03% to 3% by weight of polymer gum; and 0.5% to 5% by weight of sodium alginate;
(b) granulating the mixed composition for production of cat litter by supplying the mixed composition of step (a) to the granulator; and
(c) drying the granules molded in step (b).

Advantageous Effects

The composition for production of cat litter of the present disclosure provides excellent deodorization and dehumidification ability by using coffee grounds that are convenient because it can be thrown into the toilet bowl, can be produced from small particles that cats like, and provides an eco-friendly and economic effect by using waste.

In addition, since the cat litter of the present disclosure uses the composition for production of cat litter, the same effect is provided.

In addition, the method for production of cat litter of the present disclosure provides the effect of making it possible to produce cat litter from small particles that cats like.

BEST MODE

Figure 1:
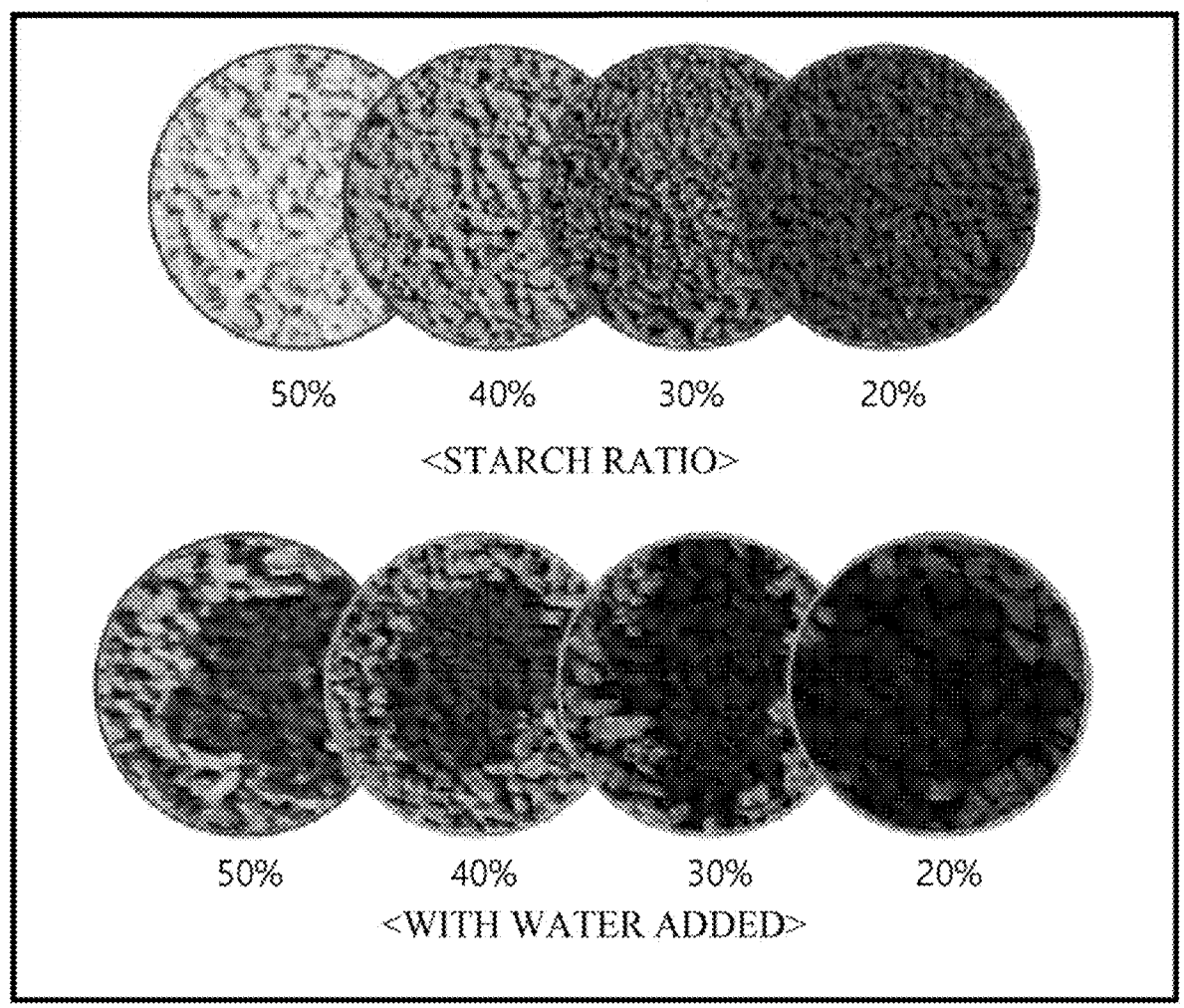
FIG. 1 is a photograph showing the shape of cat litter according to the starch content of the present disclosure and the state after adding water.
Figure 2:
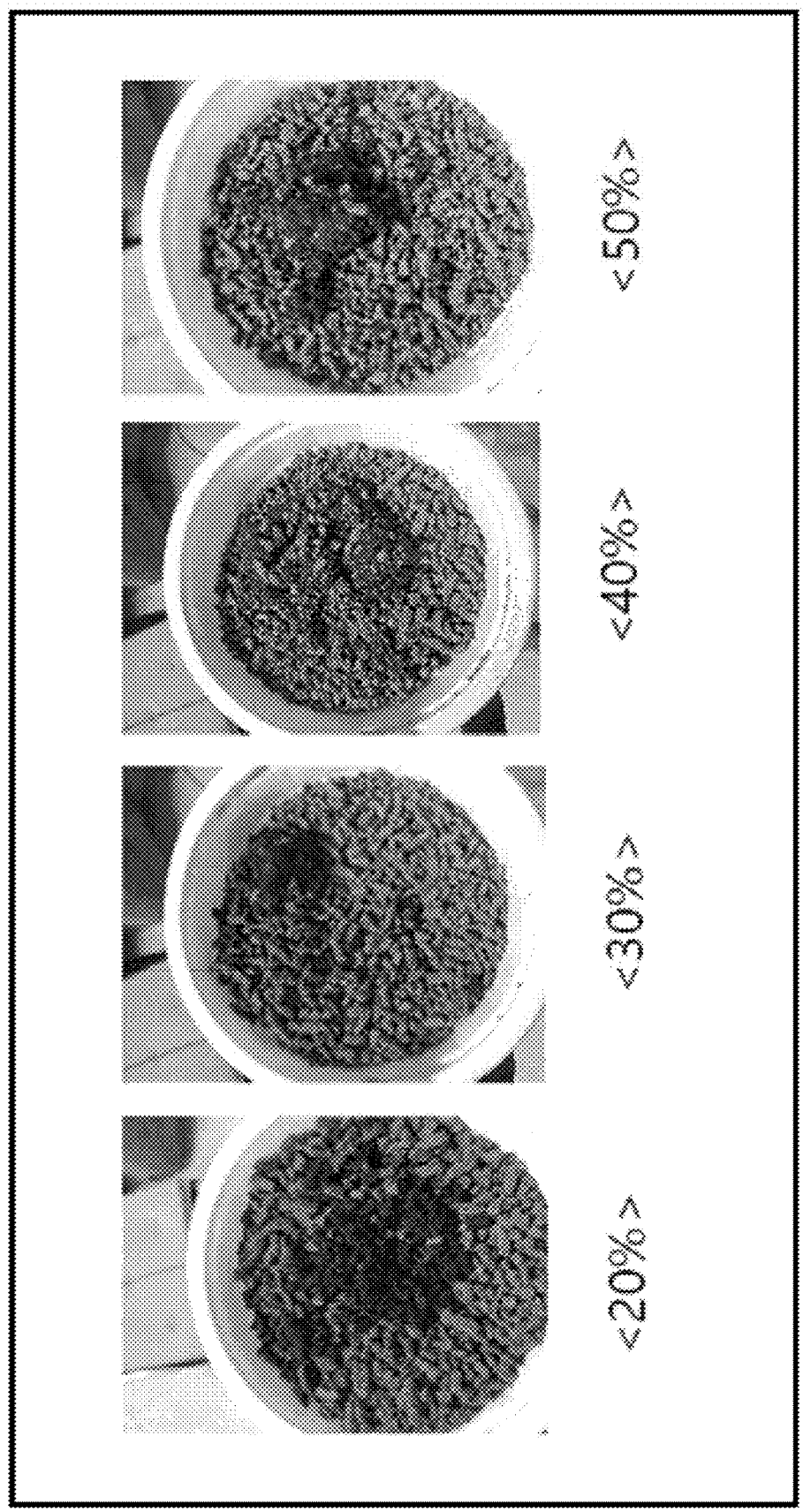
FIG. 2 is a photograph showing the results of a water absorption test according to the starch content of cat litter of the present disclosure.
Figure 3:
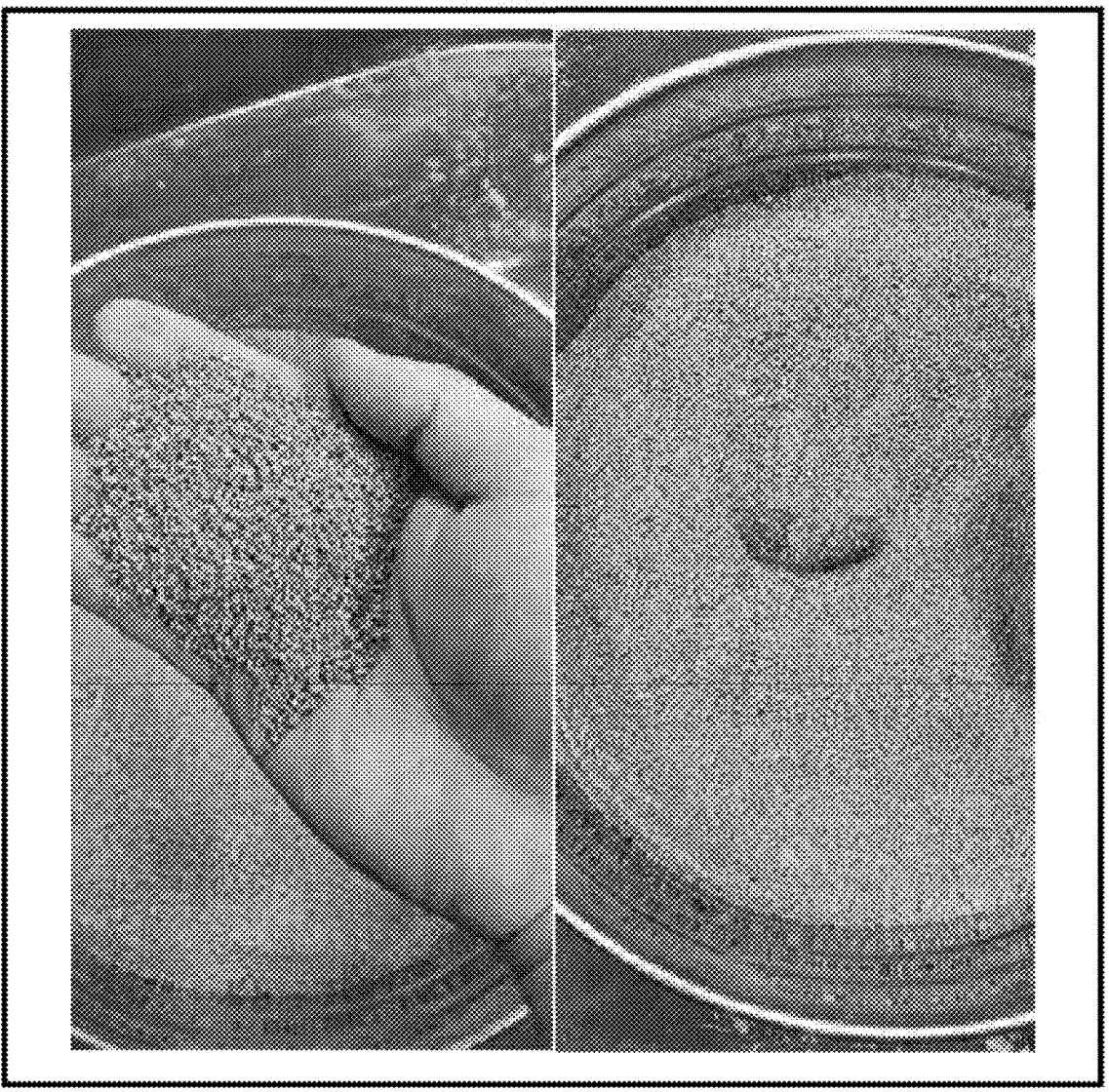
FIG. 3 is a photograph showing the shape and water absorption state of cat litter of the present disclosure.
Figure 4:
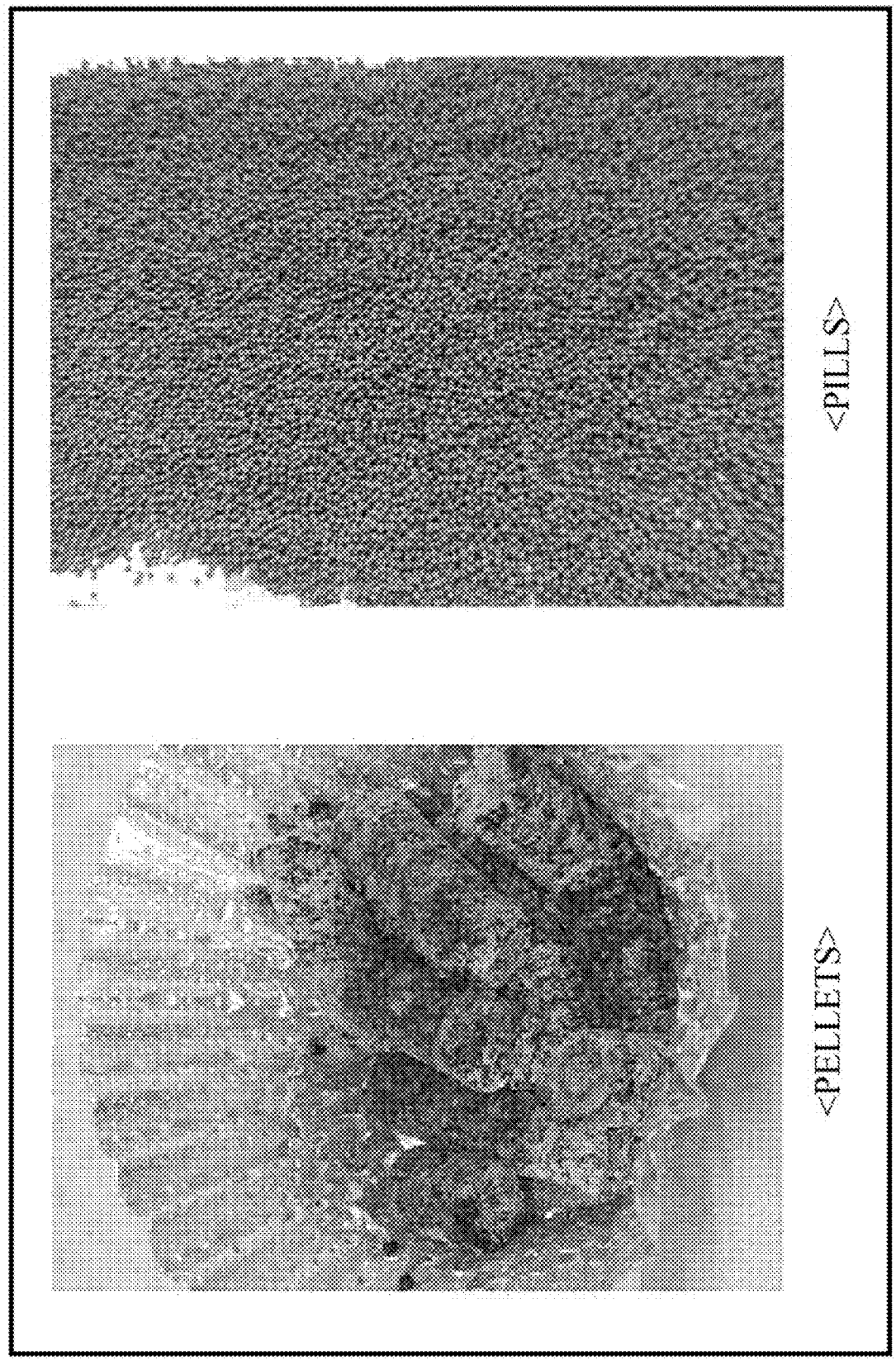
FIG. 4 is a photograph showing another form of cat litter of the present disclosure.

Hereinafter, the present disclosure will be described in detail.

The present disclosure relates to a composition for production of cat litter, the composition includes: 45% to 58% by weight of coffee grounds; 40% to 50% by weight of natural polymer; 0.03% to 3% by weight of polymer gum; and 0.5% to 5% by weight of sodium alginate.

The use of the coffee grounds is preferable in terms of resource recycling and the environment because the coffee grounds are obtained from residues discarded after making coffee.

The coffee grounds may be included in 45 to 58% by weight. When the amount of coffee grounds is less than 45% by weight, it is not preferable because the deodorizing power is reduced, and when the amount of coffee grounds exceeds 58% by weight, the coagulability is weakened while the content of starch is insufficient, so it is not preferable.

The coffee gonads may have a moisture content of 10% to 35% by weight. However, the present disclosure is not limited thereto.

The coffee grounds may be fermented being decaffeinated. The decaffeinated fermentation means microbial fermentation of coffee grounds (refer to Korean Patent No. 10-1801655 for fermentation method). The fermented coffee grounds may have a moisture content of less than 5%.

As the natural polymer, for example, at least one selected from gelatin, alginate, starch etc., may be used, and in particular, starch may be preferably used.

When the natural polymer is included in an amount of less than 40% by weight, cat litter is not solidified as one lump, and absorption power is not good when moisture is added, and when the natural polymer is included in an amount of more than 50% by weight, coagulation power is improved, but deodorization power is degraded.

As the starch, any starch known in the art may be used without limitation. For example, wheat, corn, cassava, rice, potato starch, etc., are mentioned. Starch has different properties, such as viscosity, depending on the raw material. Comparing only the viscosity, wheat<corn<cassava<rice<potato starch has the highest viscosity, and rice has the smallest molecular size. All of the highest viscosities appear at a high temperature of 70 degrees or higher, but there are some types in which the viscosity rapidly decreases when heated above a certain level.

When the starch is included in an amount of less than 40% by weight, cat litter is not solidified as one lump, and absorption power is not good when moisture is added, and when the natural polymer is included in an amount of more than 50% by weight, coagulation power is improved, but deodorization power is degraded.

As the polymer gum may use, far example, at least one selected from the group consisting of sodium polyacrylate, propylene glycol alginate, methyl cellulose, sodium carboxymethyl cellulose, calcium carboxymethyl cellulose, sodium carboxymethyl starch, guar gum, xanthan gum, gum arabic, gum ghatti, gum locust bean, gum dammar, gum gellan, gum rosin, gum karaya, gum copal, gum tara, gum tamarind, and gum tragacanth.

The composition for production of cat litter may further include 30 to 50 parts by weight of water based on 100 parts by weight of the solid content.

In addition, the present disclosure relates to cat litter made of the composition for production of cat litter.

The cat litter may have an average diameter of 0.05 to 5 mm, more preferably 0.1 to 2 mm.

In addition, the present disclosure relates to a composition for production of cat litter, the composition includes: (a) mixing a composition for production of cat litter including: 45% to 58% by weight of coffee grounds; 40% to 50% by weight of natural polymer; 0.03% to 3% by weight of polymer gum; and 0.5% to 5% by weight of sodium alginate;

(b) granulating the mixed composition for production of cat litter by supplying the mixed composition of step (a) to the granulator; and (c) drying the granules molded in step (b).

Since the contents described in the composition for production of cat litter can be applied to all methods for production of cat litter, overlapping contents will be omitted.

The composition for production of cat litter in step (a) may further include 30 to 50 parts by weight of water based on 100 parts by weight of the solid content.

The coffee grounds included in the composition for production of cat litter of step (a) may have a moisture content of 10% to 35% by weight.

The drying in step (c) may be performed using a hot air dryer.

Hereinafter, the present disclosure will be described in more detail through examples. However, the following examples are provided to explain the present disclosure in more detail, and the scope of the present disclosure is not limited by the following examples. The following examples can be appropriately modified and changed by those skilled in the art within the scope of the present disclosure.

Example 1: Production of Cat Litter Composition 10 kg of a composition for production of cat litter including 5.78 kg of coffee grounds (decaffeinated fermentation) having a water content of 3% by weight, 4 kg of starch, 20 g of propyleneglycol alginate, and 200 g of sodium alginate was produced.

Example 2: Production of Cat Litter Composition 10 kg of a composition for production of cat litter including 4.78 kg of coffee grounds having a water content of 10% to 35% by weight, 5 kg of starch, 20 g of propyleneglycol alginate, and 200 g of sodium alginate was produced.

Comparative Example 1: Production of Cat Litter Composition 10 kg of a composition for production of cat litter including 7.78 kg of coffee grounds having a water content of 10% to 35% by weight, 2 kg of starch, 20 g of propyleneglycol alginate, and 200 g of sodium alginate was produced.

Comparative Example 2: Production of Cat Litter Composition 10 kg of a composition for production of cat litter including 6.78 kg of coffee grounds having a water content of 10% to 35% by weight, 3 kg of starch, 20 g of propyleneglycol alginate, and 200 g of sodium alginate was produced.

Comparative Example 3: Production of Cat Litter Composition 10 kg of a composition for production of cat litter including 5 kg of coffee grounds having a water content of 10% to 35% by weight, 1 kg of alpha starch, and 4 kg of beta starch was produced.

Comparative Example 4: Production of Cat Litter Composition 10 kg of a composition for production of cat litter including 5 kg of coffee grounds having a water content of 10% to 35% by weight, 1.5 kg of alpha starch, and 3.5 kg of beta starch was produced.

Examples 3 to 4 and Comparative Examples 6 to 9: Production of Cat Litter Composition The composition for production of cat litter produced in Examples 1 and 2 and Comparative Examples 1 to 4 was evenly mixed with 4 liters of water and mixed without agglomeration and then supplied to a granulator to mold granules having an average particle diameter of 0.5 to 1 mm. Next, the molded granules were dried using a hot air dryer.

Comparative Example 10: Cat Litter

Cat litter was produced with bentonite and used as a Comparative Example.

Comparative Example 11: Cat Litter

Cat litter was produced from super absorbent polymer (SAP) and used as a Comparative Example.

Experimental Example 1: Performance Evaluation of Cat Litter

The performance of the cat litter of Examples 3 and 4 and the cat litter of Comparative Examples 6 to 11 was checked, and the results are shown in Table 1 below.

(1) Evaluation Method

Coagulation force: Evaluated based on whether the lumps solidified within 1 minute when 20° C. to 35° C. of moisture has been dropped is dropped from a position of 30 cm or more to maintain its shape.

Moldability: Evaluated based on whether the shape remains even and constant

Desertification: Evaluated based on whether the grains of sand are smaller than 1 mm, so the cat gets the grains on its feet can carry the grains outside the cat litter box Deodorizing power: Lay sand on a 25 $cm^3$ cube acrylic board and drop ammonia water (10 times diluted) at 20° C. to 35° C. to smell it and evaluate the deodorizing power.

Dusting: Evaluated based on whether the sand is broken into small pieces due to weak durability or the occurrence of powder flying due to the small size of the sand.

Price: Evaluated based on the average price of commercial products

Absorption: Evaluated based on the rate at which water is absorbed when water at 20° C. to 35° C. is dropped.

(2) Evaluation Criteria

○ Excellent, Δ Normal, X insufficient

TABLE 1

| Cat litter | Example 3 | Example 4 | Comparative Example 6 | Comparative Example 7 | Comparative Example 8 | Comparative Example 9 | Comparative Example 10 | Comparative Example 11 |
|---|---|---|---|---|---|---|---|---|
| Composition for production of cat litter | Example 1 Preparation | Example 2 Preparation | Comparative Example 1 Preparation | Comparative Example 2 Preparation | Comparative Example 3 Preparation | Comparative Example 4 Preparation | — | — |
| | Propylene glycol alginate (0.2%) + Starch (40%) | Propylene glycol alginate (0.2%) + Starch (50%) | Propylene glycol alginate (0.2%) + Starch (20%) | Propylene glycol alginate (0.2%) + Starch (30%) | Alpha starch (10%) + starch (40%) | Alpha starch (15%) + starch (35%) | Bentonite | Super absorbent polymer (sop) |
| Coagulation power | ○ | ○ | x | x | x | x | x | x |
| Moldability | ○ | ○ | ○ | ○ | ○ | Δ | ○ | x |
| Desertification | Occur Not occur | Occur Not occur | Occur Not occur | Occur Not occur | Occur Not occur | Occur Not occur | Occur Not occur | Occur Not occur |
| Deodorizing power | ○ | ○ | ○ | ○ | ○ | ○ | ○ | ○ |
| Dust blowing | Occur Not occur | Occur Not occur | Occur Not occur | Occur Not occur | Occur Not occur | Occur Not occur | Occur Not occur | Occur Not occur |
| Price | ○ | ○ | ○ | ○ | ○ | x | ○ | Δ |
| Absorption power | ○ | ○ | Δ | Δ | Δ | Δ | Δ | ○ |

Experimental Example 2: Performance Evaluation of Cat Litter

For the composition for production of cat litter of Example 1, cat litter was produced using various devices, and the physical properties and characteristics of the produced cat litter were evaluated, and the results are shown in Table 2 below.

<Evaluation Criteria>
○ Excellent, Δ Normal, X insufficient

TABLE 2

|  | Noodle making machine | Granulator | | Double screw (pellet) | |
|---|---|---|---|---|---|
| Coagulation power | Δ | x | ○ | x | x |
| Moldability | ○ | ○ | ○ | x | ○ |
| Desertification | Not occur | Not occur | Occur None | Not occur | Not occur |
| Deodorizing power | ○ | x | ○ | x | x |
| Dust blowing | Not occur | Occur | Occur None | Occur | Occur |
| Color | Brown | Dark brown | Grayish brown | Black | Dark brown |

As shown Table 2 above, it was confirmed that cat litter was most preferably produced using a granulator.

The invention claimed is:

1. A composition for production of cat litter, the composition consisting of:
   45% to 58% by weight of coffee grounds;
   40% to 50% by weight of natural polymer;
   0.03% to 3% by weight of polymer gum;
   0.5% to 5% by weight of sodium alginate; and
   30 to 50 parts by weight of water based on 100 parts by weight of a solid content consisting of the coffee grounds, the natural polymer, the polymer gum, and the sodium alginate,
   wherein the coffee grounds are decaffeinated coffee grounds that have been fermented using microorganisms,
   wherein the natural polymer is starch,
   wherein silica is not included, and
   wherein the cat litter has an average diameter of 0.1 to 2 mm manufactured using a granulator.

2. The composition of claim 1, wherein the coffee grounds have a moisture content of 10% to 35% by weight.

3. A cat litter made of the composition of according to claim 1.

4. The composition of claim 1, wherein the polymer gum is at least one selected from the group consisting of sodium polyacrylate, propylene glycol alginate, methyl cellulose, sodium carboxymethyl cellulose, calcium carboxymethyl cellulose, sodium carboxymethyl starch, guar gum, xanthan gum, gum arabic, gum ghatti, gum locust bean, gum dammar, gum gellan, gum rosin, gum karaya, gum copal, gum tara, gum tamarind, and gum tragacanth.

5. The composition of claim 4, wherein the polymer gum is propylene glycol alginate.

6. A method for production of a cat litter, the method comprising:
   (a) mixing a composition for production of cat litter, the composition comprising consisting of:
   45% to 58% by weight of coffee grounds;
   40% to 50% by weight of natural polymer;
   0.03% to 3% by weight of polymer gum;
   0.5% to 5% by weight of sodium alginate; and
   30 to 50 parts by weight of water based on 100 parts by weight of a solid content of the composition consisting of the coffee grounds, the natural polymer, the polymer gum, and the sodium alginate;
   (b) granulating the composition by supplying the composition of step (a) to a granulator; and
   (c) drying the granules produced in step (b),
   wherein the coffee grounds are decaffeinated coffee grounds that have been fermented using microorganisms,
   wherein the natural polymer is starch,
   wherein silica is not included, and
   wherein the cat litter has an average diameter of 0.1 to 2 mm.

7. The method of claim 6, wherein the coffee grounds in the composition in step (a) have a moisture content of 10% to 35% by weight.

8. The method of claim 6, wherein the polymer gum is at least one selected from the group consisting of sodium polyacrylate, propylene glycol alginate, methyl cellulose, sodium carboxymethyl cellulose, calcium carboxymethyl cellulose, sodium carboxymethyl starch, guar gum, xanthan gum, gum arabic, gum ghatti, gum locust bean, gum dammar, gum gellan, gum rosin, gum karaya, gum copal, gum tara, gum tamarind, and gum tragacanth.

9. The method of claim 8, wherein the polymer gum is propylene glycol alginate.

* * * * *